Oct. 3, 1961  C. W. LEE  3,002,464
ROTARY GEAR PUMP, BEARINGS AND SEALING MEANS THEREFOR
Filed March 17, 1958  3 Sheets-Sheet 1

INVENTOR.
CLINTON W. LEE
BY *Fay & Fay*
ATTORNEYS

INVENTOR.
CLINTON W. LEE
BY
*Fay & Fay*
ATTORNEYS

Oct. 3, 1961 C. W. LEE 3,002,464
ROTARY GEAR PUMP, BEARINGS AND SEALING MEANS THEREFOR
Filed March 17, 1958 3 Sheets-Sheet 3

INVENTOR.
CLINTON W. LEE
BY
*Fay & Fay*
ATTORNEYS

United States Patent Office 3,002,464
Patented Oct. 3, 1961

3,002,464
ROTARY GEAR PUMP, BEARINGS AND
SEALING MEANS THEREFOR
Clinton W. Lee, 15906 Glendale Ave., Cleveland, Ohio
Filed Mar. 17, 1958, Ser. No. 721,805
18 Claims. (Cl. 103—126)

This invention relates to a rotary gear pump, and bearings of a new and novel design having overlapping, arcuate surfaces, and these are meant to include interlocking bearings also, together with sealing means for the bearings.

The invention herein particularly relates to a bearing structure for a rotary intermeshing gear pump or a pressure loaded gear pump, as well as a fixed clearance gear pump. Pumps having eccentrically disposed bearings and end plate portions may well use this invention and in so doing a controlled pressure chamber moves the bearing into a pressure sealing relationship.

This invention in overlapping, arcuate, mating surfaces and including the other features of the interengaging, movable bearing surfaces, together with the resilient elastomer sealing devices, is adaptable to all of the rotary gear pumps, though it will only be shown in connection with simplified pressure loaded, rotary gear pumps.

An object of this invention is to provide a new and improved rotary gear pump with a bearing and sealing structure therefor, including in the combination the use of O-rings without special configurations to seal the bearing structure for rotary gear pumps of the ordinary type or pressure loaded type.

A further object of this invention is to provide a new and improved rotary gear pump, bearing and sealing structure therefor, in which the bearing structure on at least one end of the shaft supporting the gears has an overlapping, arcuate cut, as distinguished from a conchoidal cut, to permit the use of O-rings therewith and provide improved sealing.

A further object of this invention is to incorporate the overlapping, arcuate cut in the bushings of a rotary gear pump, together with O-rings, and including a series of axially positioned, peripheral, elastomer segments to prevent the fluids from bypassing peripherally around the bearing structures. The O-rings prevent axial leakage between pump body and bearings and between the arcuate sections of bearings.

A further object of this invention is to provide an improved construction in a gear pump and bearings therefor in the nature of a sealing relationship in the bearings at the intermeshing section where the gears of the rotary gear pump intermesh and also to provide in said bearing section an arcuately positioned, movable, wear surface which will accommodate itself to axial differences in gears.

A further object of this invention is to provide an improved wear section on at least one of the bearings of a rotary gear pump that will permit axial displacement and/or wear of the arcuate segment of the bearing to provide for initial wear-in and high efficiency with reduced by-pass leakage.

A further object of this invention is to provide alternate structures for an arcuate segment in the bearing structure which is resiliently urged against the gears of a rotary gear pump.

A further object of this invention is to produce a new and improved design of an elastomer fillet or rubber pin to prevent high pressure by-pass and leakage.

A further object of this invention is to provide a novel construction of bearings for a rotary gear pump having overlapping, arcuate segments adaptable for pressure loaded and offset loaded bearings which include interlocking as well as overlapping, arcuate segments, together with wear surfaces, and a relationship over the overlaps to permit the bearings to adapt themselves to a tight sealing relationship in connection with the varying axial lengths of the gears in a rotary gear pump to provide for improved break-in and wear conditions without permanent damage to the pumps.

To the accomplishment of the foregoing and related ends, said invention then consists of the means hereinafter fully described and particularly pointed out in the claims; the following description setting forth in detail one approved means of carrying out the invention, such disclosed means, however, constituting but one of the various ways in which the principles of this invention may be used.

Figure 9:
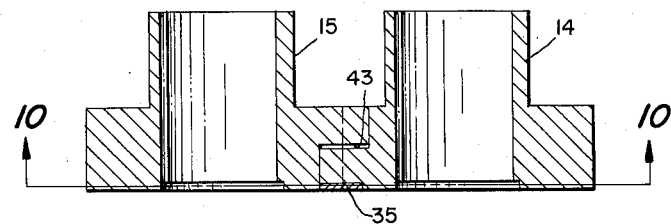
Figure 10:
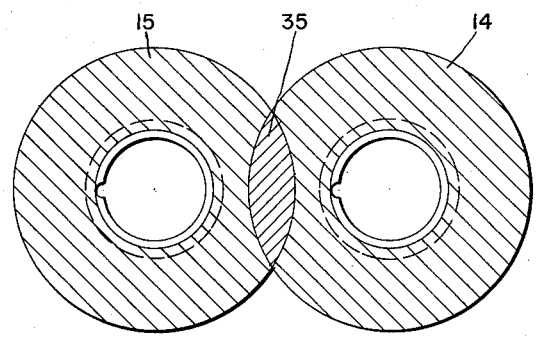

FIG. 9 is a vertical axial cross-sectional view of two mating interlocking bearings, showing a further version of a metal wear plate at the interlocking arcuate segment, together with a spacing between the interlocking bearings to permit movement of the bearings relative to one another during the initial break-in condition; and FIG. 10 is a bottom view along the line 10—10 of FIG. 9, showing the soft metal wear segment on the thrust face.

This invention relates to intermeshing, rotary gear pumps with bearings and sealing structures therefor, adaptable and useable with varying types of gear pumps and bearings, such as pressure loaded pumps and bearings and offset journal type pumps and bearings.

In connection with the drawings, the general features of the invention will be shown so that it will be clear how these may be applied to the varying types of pumps as, for example, those taught in Murray Patent No. 2,649,740, Compton Patent No. 2,820,416, Lauck Patent No. 2,527,-941, Lauck Patent No. 2,420,622 and Lauck Patent No. 2,470,355.

Figure 1:
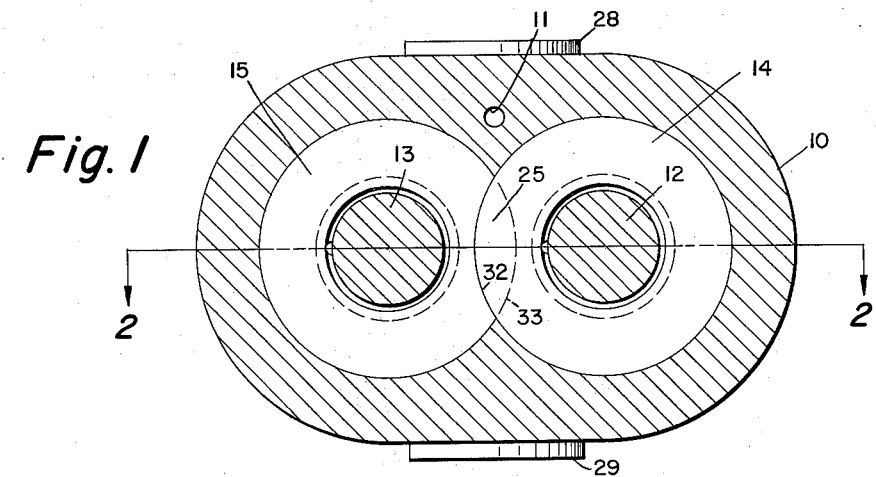
FIG. 1 is a cross-sectional top view of a simplified rotary gear pump.
Figure 2:
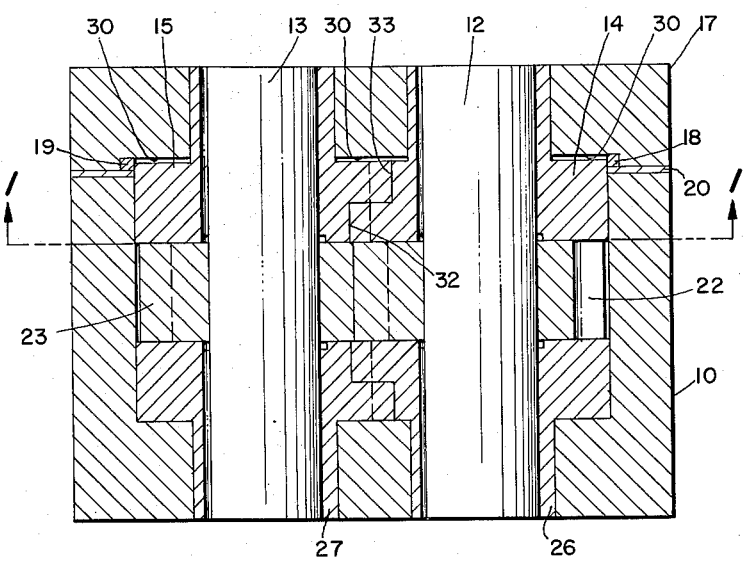
FIG. 2 is a vertical axial cross-sectional view through the gear pump, showing the interlocking arcuate segments of my new and improved invention.

FIG. 1 shows a cross-sectional plan view of the bearing along the line 1—1 of FIG. 2, with 10 showing the body of this schematic and simplified rotary gear pump. The pressure hole as shown at 11, 12 shows the cross-sectional view of one of the shafts, and 13 the opposite shaft. The end view of the bearing is shown at 14 on shaft 12, and 15 the opposite bearing. The cover plate is shown at 17, and 18 and 19 are respectively the right and left hand sections of the conventional gasket or O-ring between cover 17 and body 10. The split line is shown at 20 between the cover 17 and the body 10. The gears mounted on the shafts 12 and 13 are shown at 22 and 23. Each gear and shaft are a single part. The gears intermesh in an overlapping section which is seen between the two arcuate lines at 25. The lower bearings are shown at 26 and 27, and they may be of greater or lesser dimension than the cover bearings as seen at 14 and 15.

The pump inlet is shown generally at 29 and the outlet 28 would be on the oppositely disposed side. This simplified pump has provision, by means of the pressure hole 11, for fluid to pass from the pressurized chamber between the intermeshing gears and the body at the outlet port 28 through the pressure hole 11 to the space generally designated at 30 on the opposite side of the bearing. The other aspects of a truly pressurized pump and the springs for the initial urging of the bearings onto the axial ends of the gears are not shown in connection with this simplified version.

By means of the pressure device, pressure would be put on the bearings to hold tightly against the gears, so that the greatest efficiency in the initial priming of the pump would be apparent.

Further in connection with these bearings, there would be the overlapping, arcuate, mating surfaces, for example, bearing 14 would have an overlapping segment generally shown at 32, and this would be part of the cover bearing face extending axially some distance and would be a complete cylinder. The other bearing 15 would also having a cylindrical, overlapping surface and arcuate cut-out at bearing surface. The cylindrical surface of bearing 15 would project into the arcuate cut-out section of bearing 14, for example, at 33. The cylindrical section of bearing 14 would project into the arcuate, cut-out section of bearing 15 as shown at 32. The bearings could not rotate with respect to one another. It will also be noted, of course, that instead of just overlapping they could be interlocking, with each of the bearings having a cut-out section which would be arcuate in shape extending some axial length, and each bearing having a full cylindrical surface interlocking within the arcuate segment. This latter type is particularly important in connection with offset journal bearings.

The remaining drawings show other features which are useful in connection with this invention.

Figure 3:
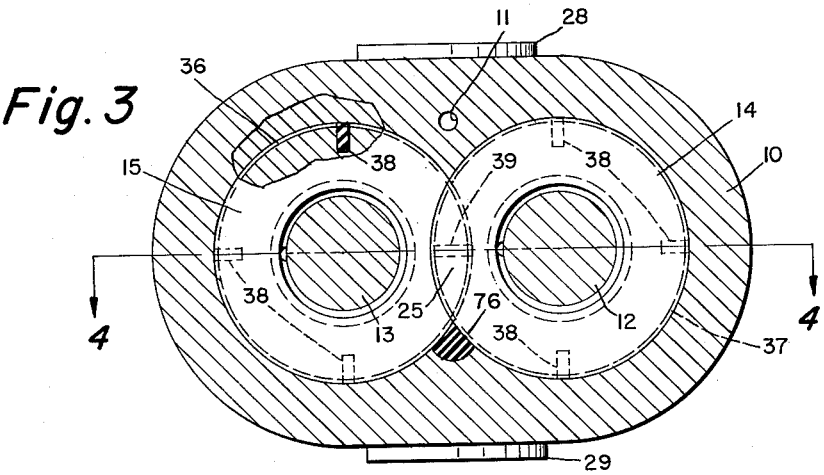
FIG. 3 is a cross-sectional view of a modification of my invention.
Figure 4:
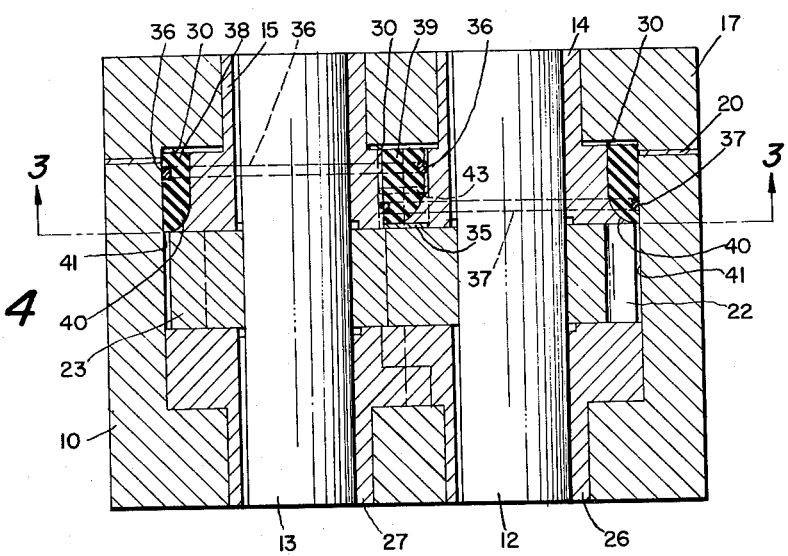
FIG. 4 is a vertical axial cross-sectional view along the line 4—4 of FIG. 3, showing a simplified version of the pump, together with the improved bearing structure and sealing means therefor.

In connection with FIGS. 3 and 4, I have shown in addition an arcuate segment against the bearing thrust face on one of the bearings, as seen in connection with FIG. 4, which is of a soft metal, perhaps .005 to .010 inch though it could be from .001 to .025 inch in thickness, and seen at 35. Similarly, on the periphery of each of the bearings would be a groove and an O-ring as seen at 36 for bearing 15 and 37 for bearing 14. At various points on the periphery of each of the bearings would be a series of axially elongated, radially extending rubber segments 38 which extend from the spacing 30 between the cover member and the rear face of the bearing almost to gear 23. These are shown at three different points on the periphery of the bearing, and although they are only shown in the top bearing, it is realized that both the cover and body bearings may be pressure loaded, in which event similar segments may be used. In general in connection with bearings, sealing will be adequate on the body bearings and it is only necessary on the cover bearings in connection with pressure loaded bearings and to take up the wear and movement of the top bearing in usage.

There is also shown in this view a rubber segment 39 which fits in the overlapping section between the two bearings. The advantage of the segment is that it prevents movement of fluid leaking past the bearings, moving peripherally around the bearings and leaking along the metal surfaces at the intersection of the bearings. The pressure from section 30 on the ends of the rubber segment will force the rubber downwardly and outwardly and provide a tight seal. There is no chance, because of the curved contour as shown at 40 and the small opening shown at 41 adjacent the end of the gear tooth, for the rubber to squeeze out and to be chewed away by the gears, but at the same time fluid cannot pass around the bearings. Since the bearings do not rotate, there is no opportunity for the rubber segments to wear away In FIG. 4 there is a spacing indicated at 43, and a similar type of spacing is also shown in connection with FIG. 9, which permits axial movement of each of the bearings with respect to one another under specified conditions while still providing a tight seal against the face of the gear.

Because there is an opportunity for fluid to leak back from the high pressure end section 30 into the low pressure intake 29, a rubber pin 76 is inserted comprising a generally cylindrical section of elastomer and it extends through about the double thickness of the overlapping, arcuate segment. This rubber pin is seen in connection with FIG. 3 and extends downwardly and in the body but not in the bearings from the space indicated at 30, half way through the second arcuate segment 32.

Figure 5:
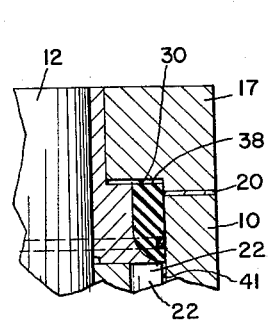
FIG. 5 is an enlarged fragmentary view of the sealing structure of the bearings.

FIG. 5 shows the details in connection with one of the rubber segments. It will be seen that above the rubber segment there is the passage for pressurized fluid and the spacing 30. The top of the segment is seen at 38. The segment will extend radially inwardly and will taper towards the pressurized cavity adjacent the gear 22 to where there is only a small opening 41 next to the intermeshing, rotating gears.

Figure 6:
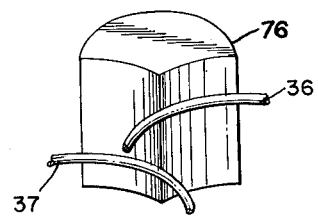
FIG. 6 is a fragmentary view of the rubber pin or elastomer fillet in connection with my invention.

In FIG. 6 it will be seen that the rubber pin 76, which fits in body 10 over the inlet port, extends from the spacing 30 above the bearings downwardly and perhaps through and into the second overlapping segment but not therethrough, and it will be of sufficient depth to incorporate grooves for each of the O-rings. This rubber pin is in the pump body, and one of the O-rings is shown at 36 and the other O-ring is shown at 37. Grooves are placed in each of the arcuate inner faces of the rubber pin. (This pin or fillet when in place in body section prevents leakage of pressures and fluids from the outlet port and pressure loaded area 30, across bearing mating surfaces back into the intake port.)

FIGS. 7 through 10 show the various types of metal segments for the overlapping section between the bearing faces. FIG. 10 shows the one illustrated in connection with FIG. 4, and this has the bearing segment 35 on the bearing 14. However, it could be used also on bearing 15 when not used on 14.

The idea behind this particular combination is that the matching of gears is indeed a difficult problem and assuming one or the other of the gears, for example in FIGS. 1 and 2 or FIGS. 3 and 4, has an axial length greater than the other by an amount perhaps as great as .005 or less, it will be seen that in the intermeshing section one of the gears' teeth would be inclined to wear away the soft metal bearing surface 35. The bearings themselves would be pressurized to come down against the gear teeth and against the axial edges of the gears, and in this way the initial break-in period in testing a new pump even under close inspection conditions might well be faulty but with this wear surface the longer gear teeth, which in the example given was the gear 13 for bearing 15, would wear away the arcuate segment on bearing 14, said segment being shown at 35. However, in the event the conditions were reversed and the opposite gear 12 had a longer axial length, then the gear teeth would be against the wear segment 35 and in order to provide a tight sealing effect on the gear, the bearing 15 could move down slightly. The space indicated at 43 is for this purpose, and it will be seen that for the axial length of perhaps .005, bearing 15, generally being pressure loaded, would move down by about this amount. It is to be understood that the body bearings would be fixedly in place within the body and could not move. However, there are cases where both body and cover bearings are pressure loaded and can move.

Figure 7:
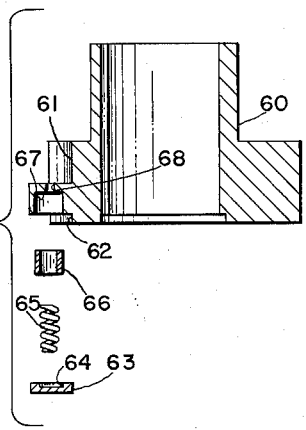
FIG. 7 is an exploded view of one of the two interlocking arcuate bearings, showing the details of the manner in which the arcuate segment is resiliently positioned on the bearing thrust face along with fluid passage.

As to the other modifications shown and in connection with FIG. 7, a bearing is shown at 60 and is one of a pair of interlocking bearings. The arcuate, cut-out section 61 mates with the opposite bearing not shown. The arcuate segment 62 has a plate section 63 similarly shaped to section 35 in FIGS. 9 and 10 and is backed up by a recess 64 and a spring 65 which is held in position by a small bushing 66 fitting into groove 67. A small opening 68 permits the fluid from the pressurized section 30 to pass and hold the plate against the top of the intermeshing gears. This segment works substantially the same way, in that pressure of the fluid from section 30 and of the spring 65 holds the plate 63 against the intermeshing gear teeth and if either set of gear teeth has a greater axial length then the plate will not seat completely, and this arcuate segment will be raised slightly. However, it does not matter which gear is of greater axial length as the segment will be held out in either event.

Figure 8:
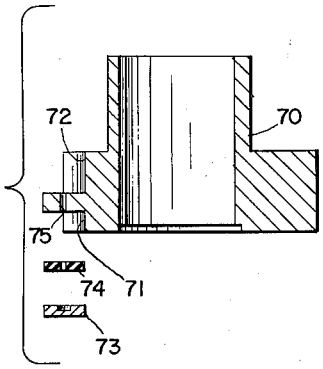
FIG. 8 is an alternate modification, showing an arcuate thrust face resiliently mounted with the interconnecting fluid passage for a pressure loaded bearing.

FIG. 8 is slightly different, and bearing 70 has an arcuate segment shown generally at 71 in which there is a cut-out, arcuate segment 72 for the opposite bearing not shown. The plate member 73 is backed up by means of elastomer 74 and fits within the groove 71. A small opening 75 permits fluid to get behind the plate 73 during the initial starting-up period so that the pump will develop maximum efficiency from the beginning. This segment forms in the manner of the other segments.

By this combination of parts, it will be seen that an improved rotary gear pump has been devised with improved arcuate, overlapping segments which may in some cases be interlocking, and improved wear plates have been developed on the bearings for the intermeshing gear teeth. It is realized that only the most simplified explanation has been given of this invention, but the principles may be applied to more complex gear pumps where there are a greater number of gears used.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

I claim:

1. In a rotary gear pump having intermeshing gears, a body member, at least a pair of gears mounted in said body member, inlet and outlet means therefor, a pair of bearings at least on one end of said gears and supporting said gears against appreciable axial movements, cover means for the pump, each of said bearings being cylindrical in cross section on at least one axial portion of the bearing and each of said bearings having an arcuate segment shaped groove in radially overlapping and longitudinally interlocking relationship with the arcuate segment of the other bearing into which the mating cylindrical shape of the other bearing forms a sealing fit so that the side faces of said bearings are aligned with each other and provide a seal against the gear side faces.

2. The rotary gear pump of claim 1, in which each of the cylindrical sections on each of the bearings has a sealing ring between the bearing, and the body and cover means and between the bearings to provide improved sealing of the pump.

3. The rotary gear pump of claim 2, in which each of the sealing rings is an O-ring and is axially spaced with respect to the other ring to provide reduced axial leakage of flow back from the high pressure end to the low pressure end of the pump.

4. The rotary gear pump of claim 3, in which there is a rubber pin in the body adjacent the inlet port bounded by a cylindrically shaped cavity in the body intersected by the junction of the curved portions of the bearing, said rubber pin being of elastomer and extending almost to the inlet port.

5. Bearings for a rotary gear pump, each of said bearings having a journaling surface for the shaft of a gear for the gear pump and an external surface which has at least on one axial section a cylindrical surface, and on another axial section aligned with the first an arcuate cut-out having side and bottom wall portions providing a recess within which the axial section having a cylindrical surface of the other bearing, mates to form a sealing fit, the axial sections having cylindrical surfaces of each bearing radially overlapping one another in arcuate section, so that the side faces of said bearings are aligned with each other and provide a seal against the gear side faces.

6. The bearings of claim 5, in which the external cylindrical surface of each of said bearings has a groove, and in which a sealing ring is adapted to be secured therein.

7. The bearings of claim 5 in which the overlapping axial sections interlock with one another.

8. In a rotary gear pump having intermeshing gears, a body and a cover member, at least a pair of gears in said body, a pair of bearings on at least one end of said gears and supporting the same against appreciable axial movements, each of said bearings having an external surface which has at least on one axial section a cylindrical surface, and on another axial section aligned with the first an arcuate segment shaped recess against which the axial section having a cylindrical surface of the other bearing mates to form a sealing fit, the axial sections having cylindrical surfaces of the bearings radially overlapping each other in arcuate section, said bearings further having thrust faces aligned with each other and positioned against the side faces of the gears to provide a seal thereagainst, and further to provide a seal against one of said bearings over an area thereof formed by an arcuate segment shaped surface defined by the overlapping intermeshing gears, and which bearing is axially displaceable away from said gears, whereby in the operation of the pump each of said bearings may fit against its corresponding gear to provide a tight seal without substantial internal leakage in the pump.

9. The rotary gear pump of claim 8, in which the axially displaceable arcuate thrust surface of one of the bearings is a thin bearing surface from .001 to .025 inch thick.

10. The rotary gear pump of claim 8, in which the axially displaceable arcuate thrust face of one of the bearings is resiliently urged against the gear teeth.

11. The rotary gear pump of claim 8, in which the axially displaceable arcuate thrust face of one of the bearings is resiliently urged and has a metal face with an elastomer lining behind said face.

12. The rotary gear pump of claim 8, in which the axially displaceable arcuate thrust face of one of the bearings is a resilient surface having a metal arcuate contacting surface with spring means therebehind urging said metal arcuate thrust face against the gear teeth of the pump.

13. In a pressure loaded rotary gear pump having intermeshing gears, a body and a cover member, at least one pair of gears in said pump, a pair of bearings on said gears supporting the same against appreciable axial movements, means for causing pressure on the rear faces of said bearings urging said bearings towards the gears, each of said bearings being cylindrical in cross-section on at least one axial portion of the bearing, and each of said bearings having an arcuate segment shaped recess into which the axial section having a cylindrical surface of the other bearing mates to form a sealing fit, said cylindrical cross-sections radially overlapping each other, said bearings further having side faces aligned with each other whereby a seal is provided against the gear side faces and having on each of said cylindrical surfaces sealing means to prevent the flow of fluid axially therealong, and further sealing means to prevent the flow of fluid peripherally around said bearings, the latter sealing means comprising at least one sealing segment on the peripheral surface of each of said bearings, said segment being radially extending and axially extending over the cylindrical surface of said bearings, without extending axially to the gears.

14. The rotary gear pump of claim 13, in which the radial segment extends radially in said bearings towards the peripheral surface, and tapers to the peripheral surface adjacent the gears of the rotary gear pump.

15. The rotary gear pump of claim 13, in which there are peripheral seals on at least three parts of each of the bearings to prevent peripheral leakage around the bearings.

16. The rotary gear pump of claim 13 in which an axial section having a cylindrical surface of one bearing and an axial section having a mating arcuate cut-out having side and bottom wall portions of another bearing, the axial sections having cylindrical surfaces radially overlapping in arcuate section to form a seal to prevent leakage both axially and around the peripheral surfaces of said arcuate section.

17. The rotary gear pump of claim 13 in which there is an axially displeaceable arcuate overlapping segment on the thrust face of one of the bearings, and in which the axial length of said overlapping arcuate segment is shorter than the cavity in its mating bearing, whereby the displacement of said axially displaceable material will permit the bearings to seat against the intermeshing gear faces to provide high pump efficiency.

18. The rotary gear pump of claim 13, in which there is a rubber pin mounted in a cavity in the body of the rotary gear pump axially extending adjacent the junction of the two bearings at the inlet port, said rubber pin providing a sealing surface to prevent high pressure fluid from flowing back into the inlet port from the pressure loaded area, said rubber pin being distortable by the fluid pressure within the pump sealing off fluid leakage into the inlet side of the pump.

References Cited in the file of this patent

UNITED STATES PATENTS

| | | |
|---|---|---|
| 557,476 | Boom | Mar. 31, 1896 |
| 621,280 | Pitt | Mar. 14, 1899 |
| 815,522 | Fraser | Mar. 20, 1906 |
| 1,285,819 | Smith | Nov. 26, 1918 |
| 1,597,411 | Kinney | Aug. 24, 1926 |
| 1,626,115 | Egersdorfer | Apr. 26, 1927 |
| 2,293,126 | Fersing | Aug. 18, 1942 |
| 2,470,355 | Lauck | May 17, 1949 |
| 2,600,477 | Burt | June 17, 1952 |
| 2,649,740 | Murray et al. | Aug. 25, 1953 |
| 2,654,325 | Minshall | Oct. 6, 1953 |
| 2,691,945 | Wichorek | Oct. 19, 1954 |
| 2,695,566 | Compton | Nov. 30, 1954 |
| 2,707,441 | Drennen | May 3, 1955 |
| 2,756,681 | Oliver | July 31, 1956 |
| 2,759,426 | Blomgren et al. | Aug. 21, 1956 |
| 2,816,512 | Murray | Dec. 17, 1957 |
| 2,881,704 | Murray | Apr. 14, 1959 |

FOREIGN PATENTS

| | | |
|---|---|---|
| 574,382 | Canada | Apr. 21, 1959 |
| 732,914 | Germany | Mar. 15, 1943 |
| 1,006,722 | Germany | Apr. 18, 1957 |

(Patent Application KL. 59e 3/01)